United States Patent [19]

Schield et al.

[11] Patent Number: 4,471,852
[45] Date of Patent: Sep. 18, 1984

[54] ANTI-THEFT DEVICES FOR AUTOMOTIVE VEHICLES

[75] Inventors: Israel Schield, Brooklyn; Nathan G. Williford, Hollis, both of N.Y.; Joseph V. Urbano, 22 Cameron Rd., New Providence, N.J. 07974

[73] Assignees: Ike Schield, Brooklyn, N.Y.; Joseph Urbano, Green Brook, N.J.

[21] Appl. No.: 346,641

[22] Filed: Feb. 8, 1982

[51] Int. Cl.³ .............................................. B60R 25/04
[52] U.S. Cl. ............................... 180/287; 123/198 B; 340/63
[58] Field of Search .................... 180/287; 340/63, 64; 123/198 B

[56] References Cited

U.S. PATENT DOCUMENTS 4,278,963 7/1981 Allen .................................... 180/287
4,300,495 11/1981 Trevino et al. ....................... 180/287

Primary Examiner—Richard A. Bertsch
Attorney, Agent, or Firm—Norbert P. Holler

[57] ABSTRACT

An anti-theft device for an automotive vehicle such as a car or truck having fluid pressure-operated brakes is disclosed. The device includes a lockable member that, when activated while the brakes have been applied by the driver, inhibits any substantial change in the then existing fluid pressure condition in the brake fluid pressure system of the vehicle. The brakes thus remain locked, preventing normal movement of the vehicle, even if the brake pedal is subsequently released and the engine is running. The device can also include an additional lockable member for immobilizing the brake pedal to prevent its being depressed. Optionally, the device can also include one or more electrical switches which are operated, when either lockable member is activated, to ground out the distributor and/or open the ignition circuit at a point away from the ignition lock terminals, thereby to prevent starting of the engine. Preferably a special key is provided for releasing the lockable member, and special screws, e.g. screws with non-conventional heads, can be used to assemble the device as well as to mount the operator-accessible parts of the device in the vehicle so as to make its removal or disassembly more difficult. This abstract is not to be taken either as a complete exposition or as a limitation of the present invention, however, the full nature and extent of the invention being discernible only by reference to and from the entire disclosure.

13 Claims, 25 Drawing Figures

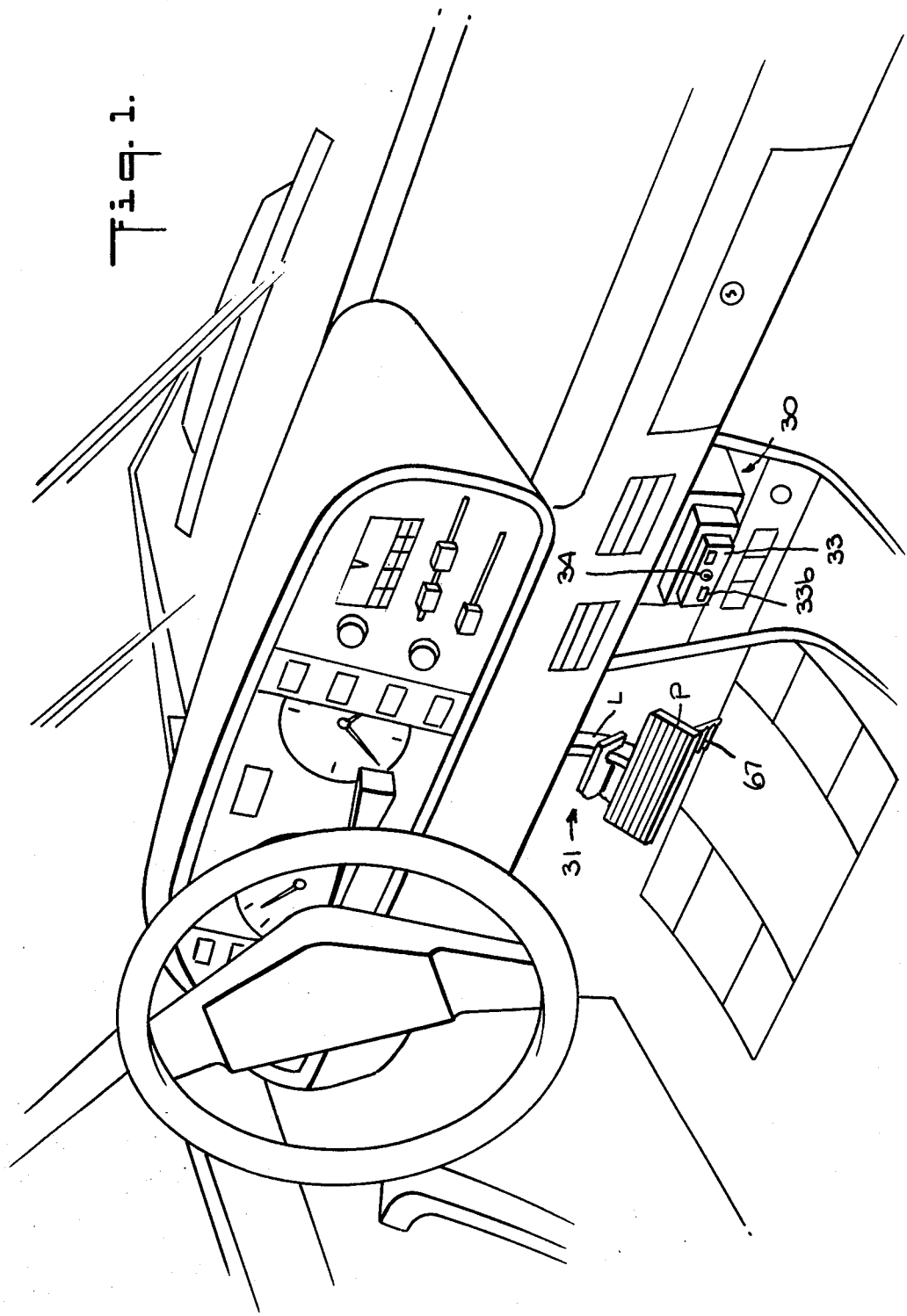

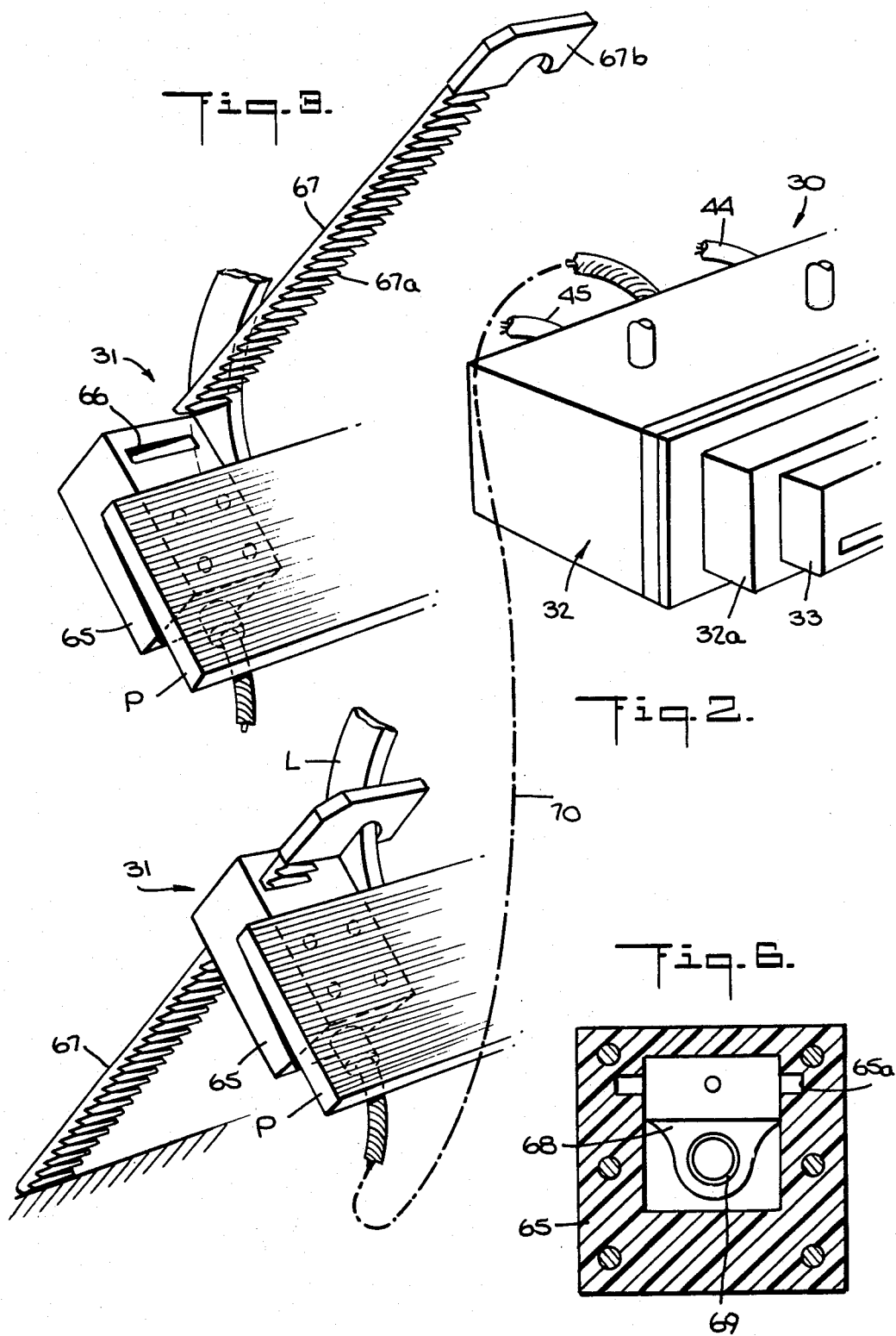

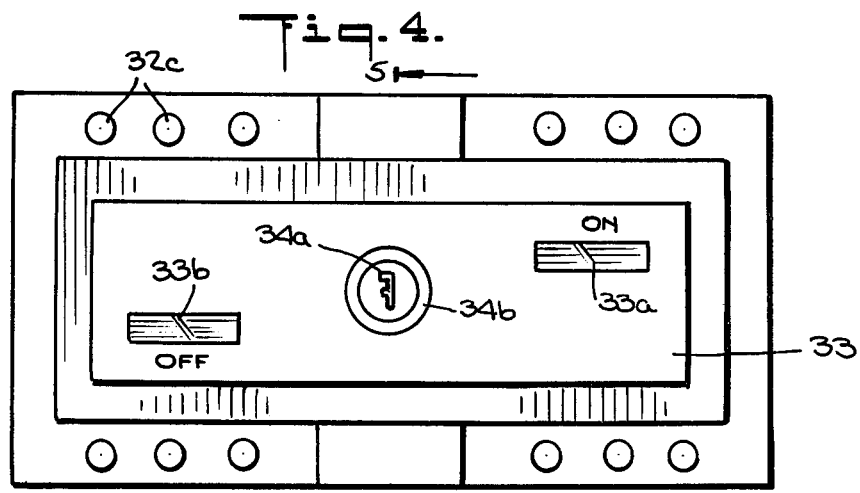
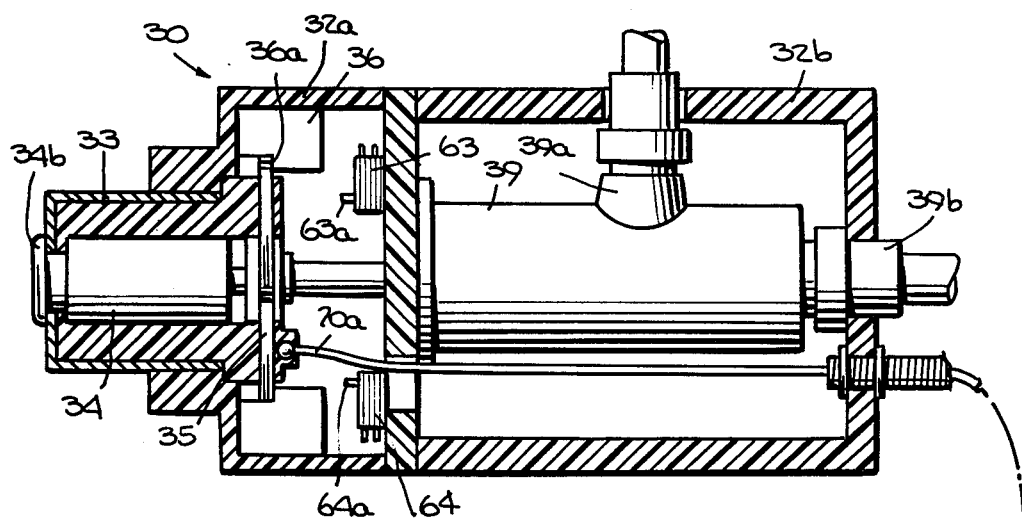
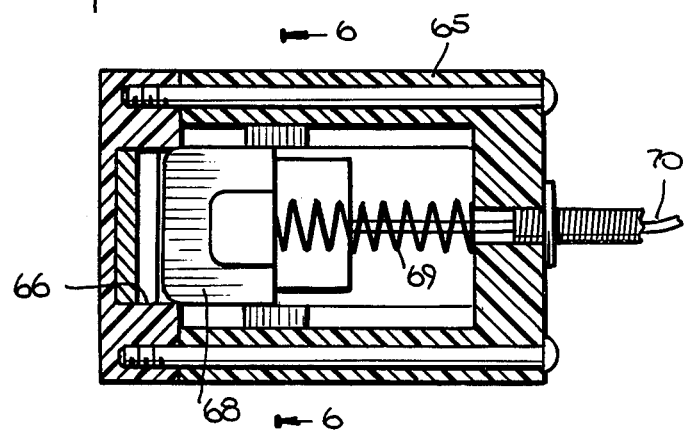

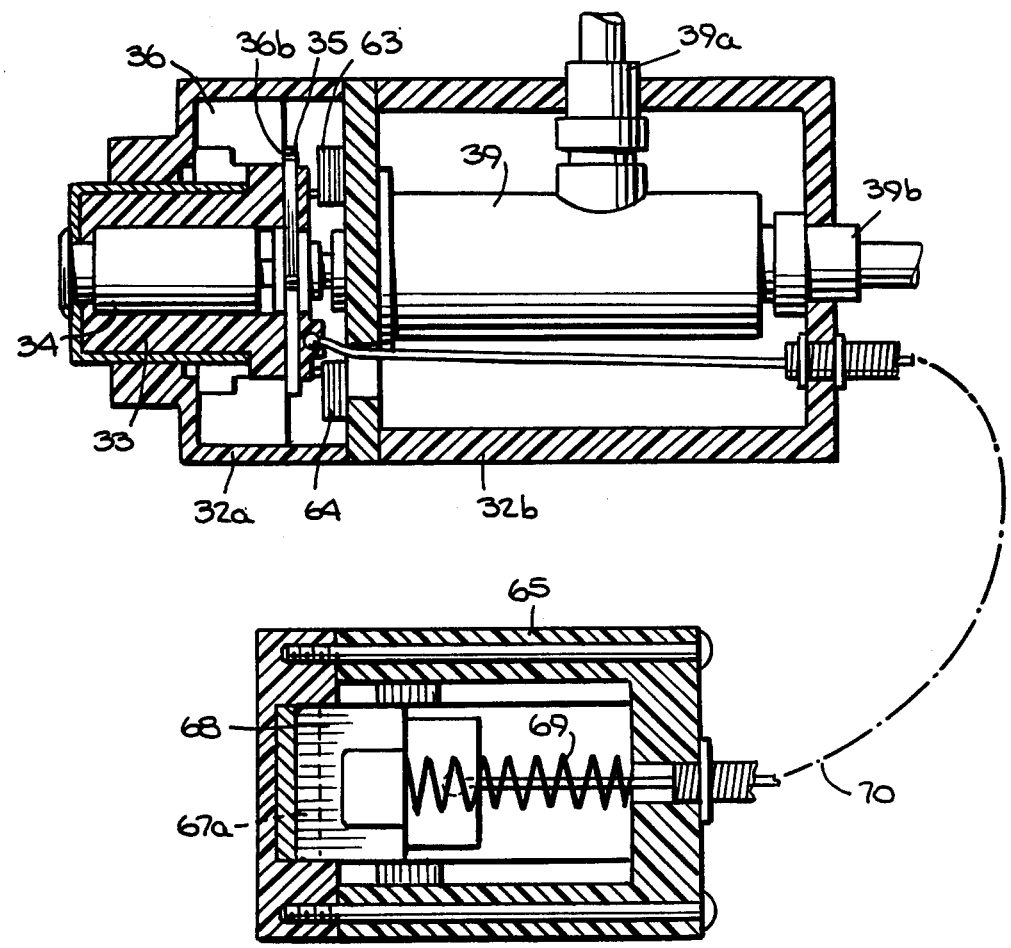
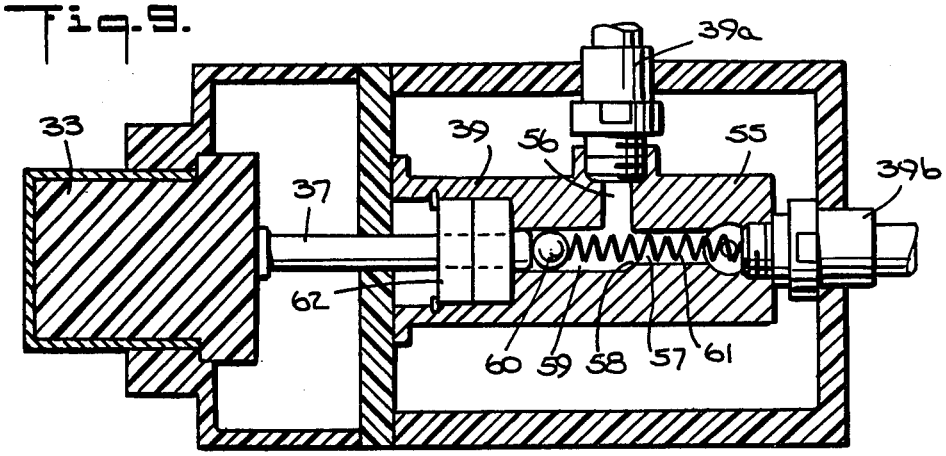

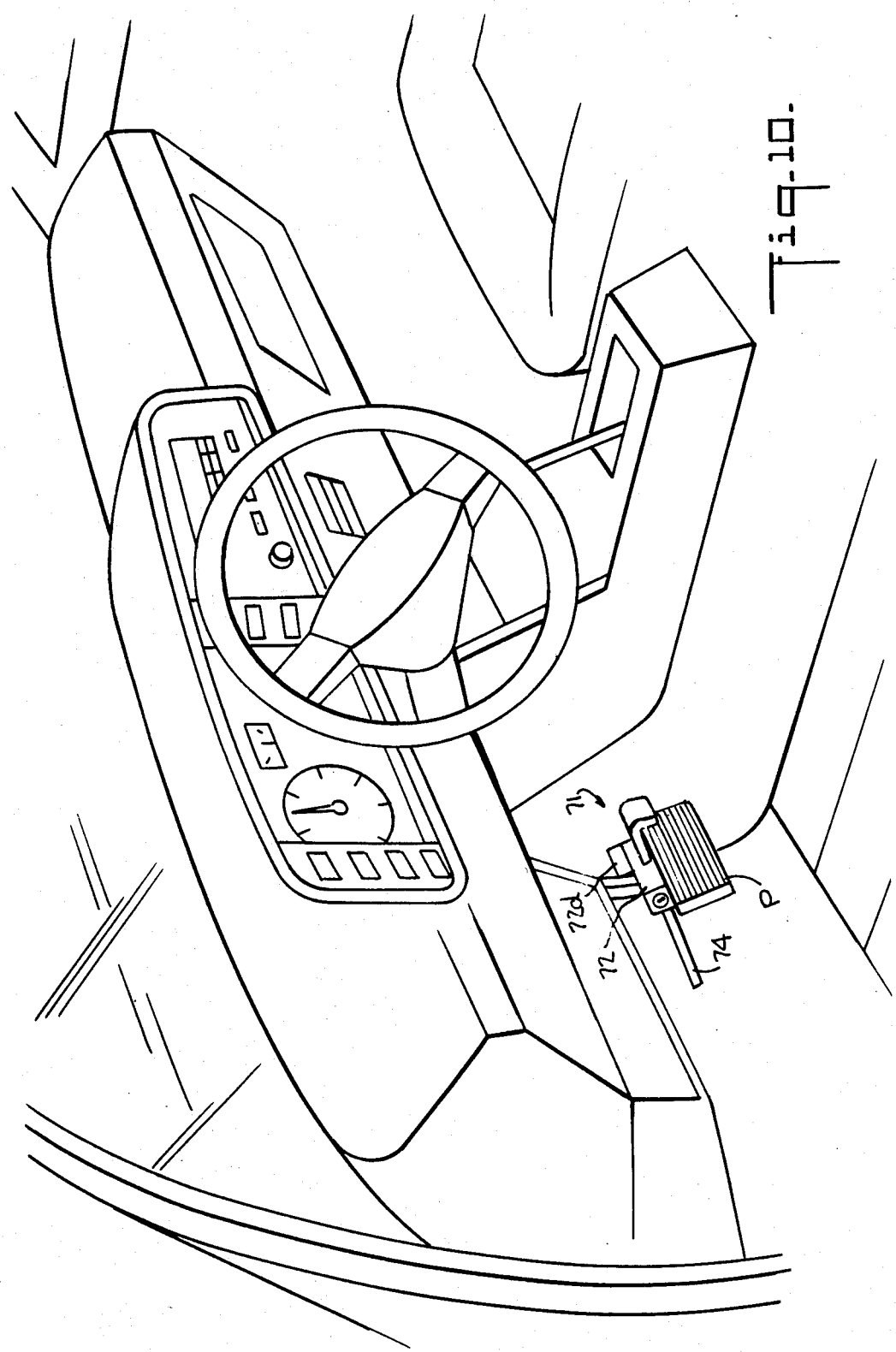

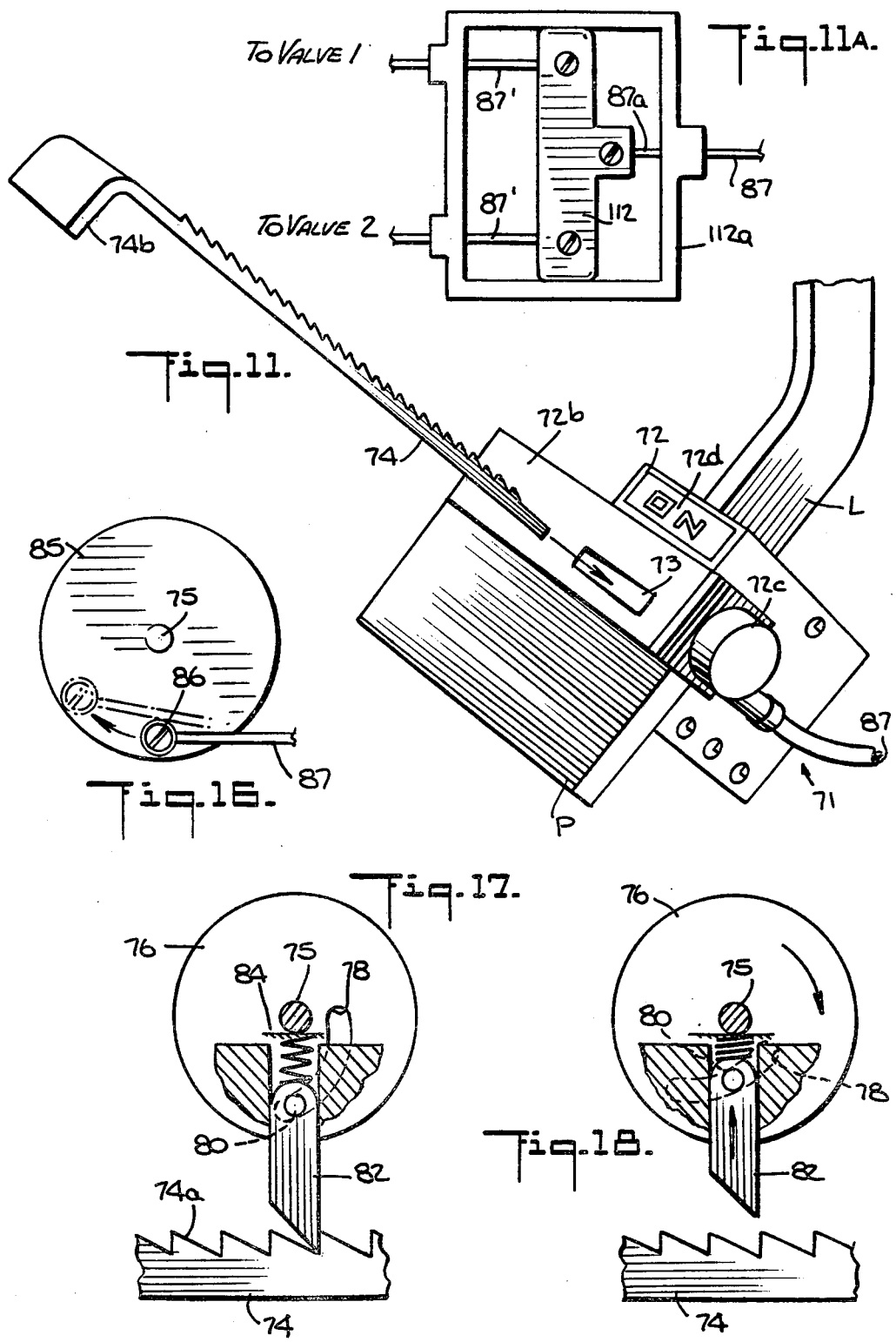

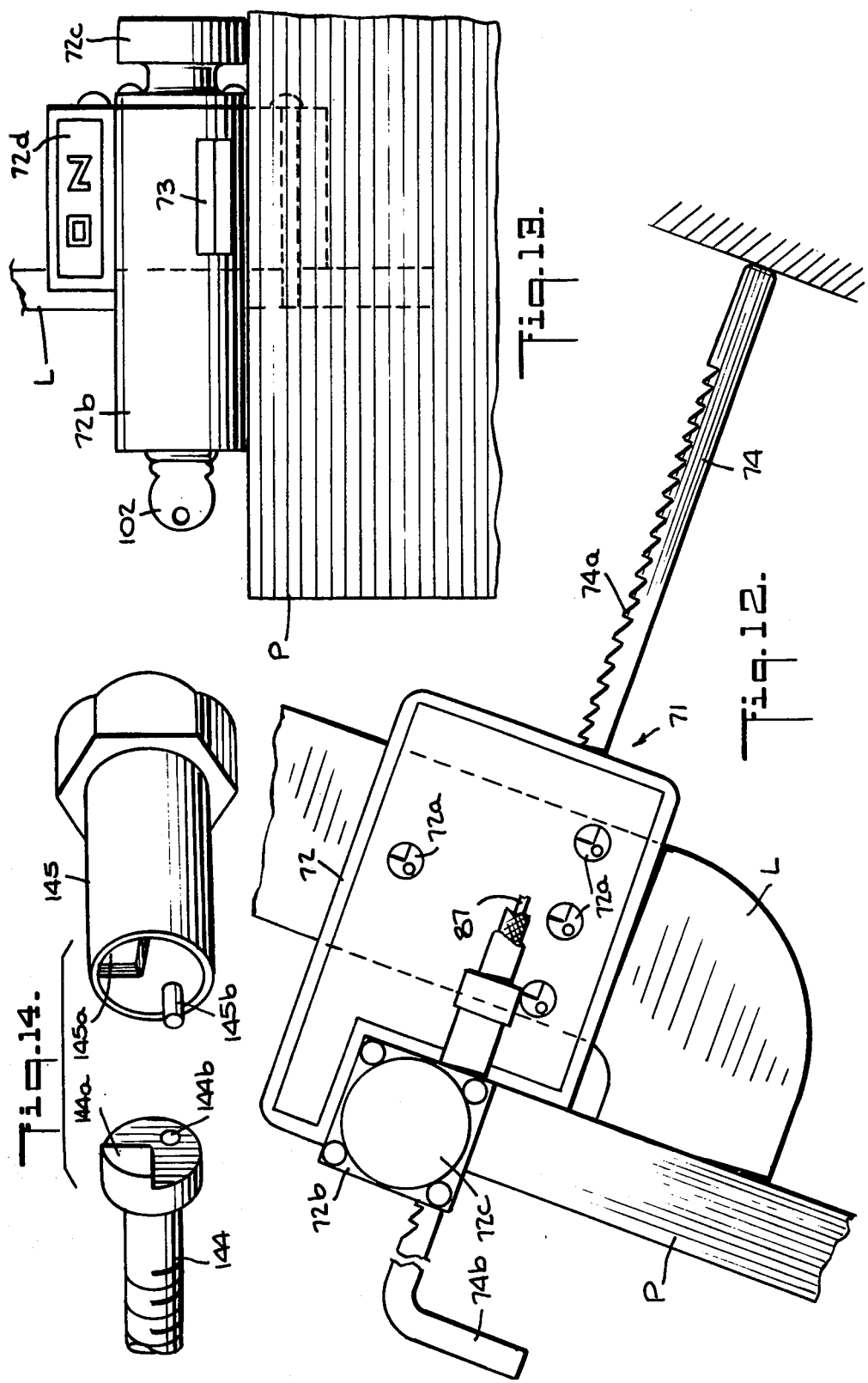

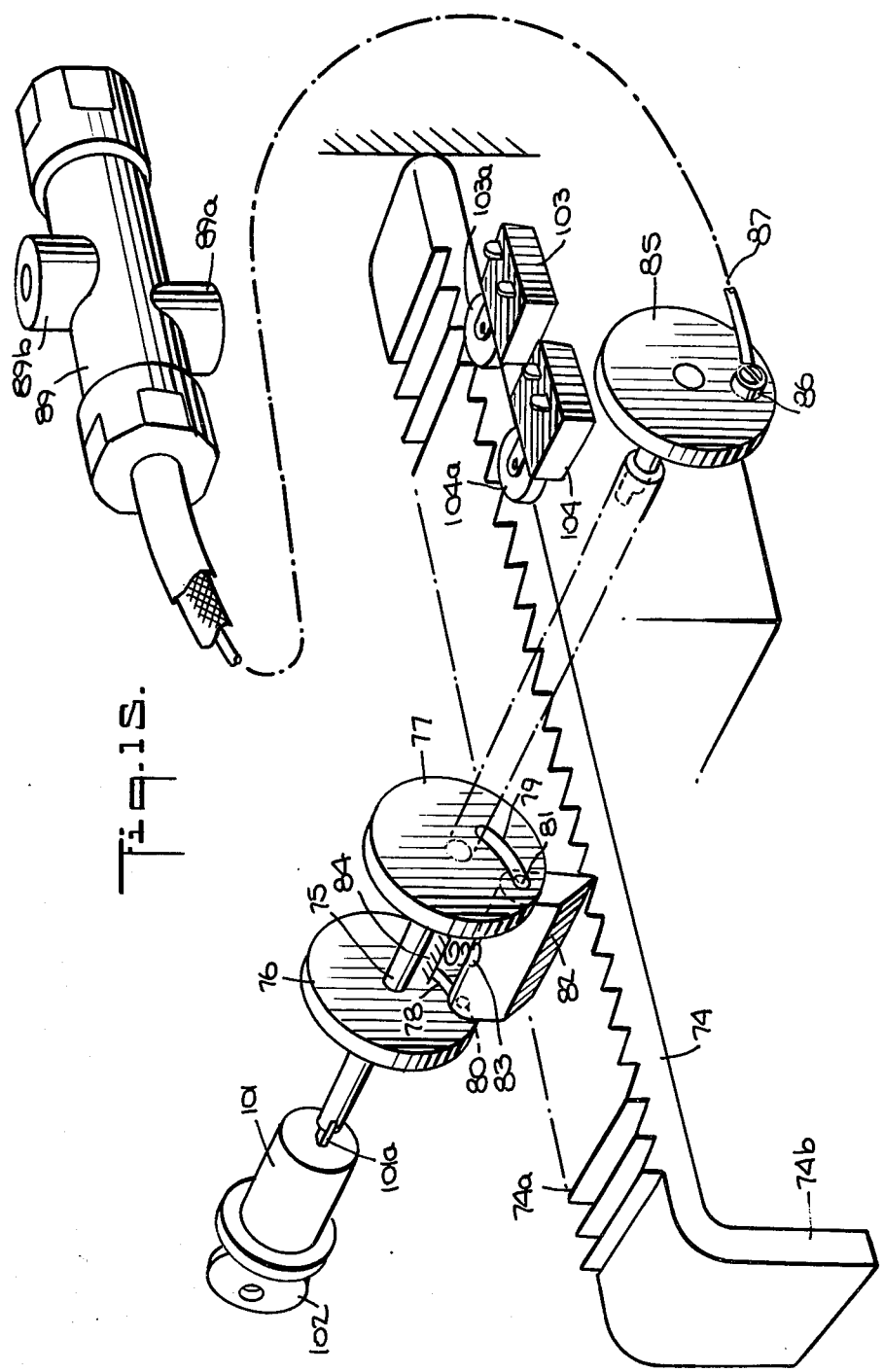

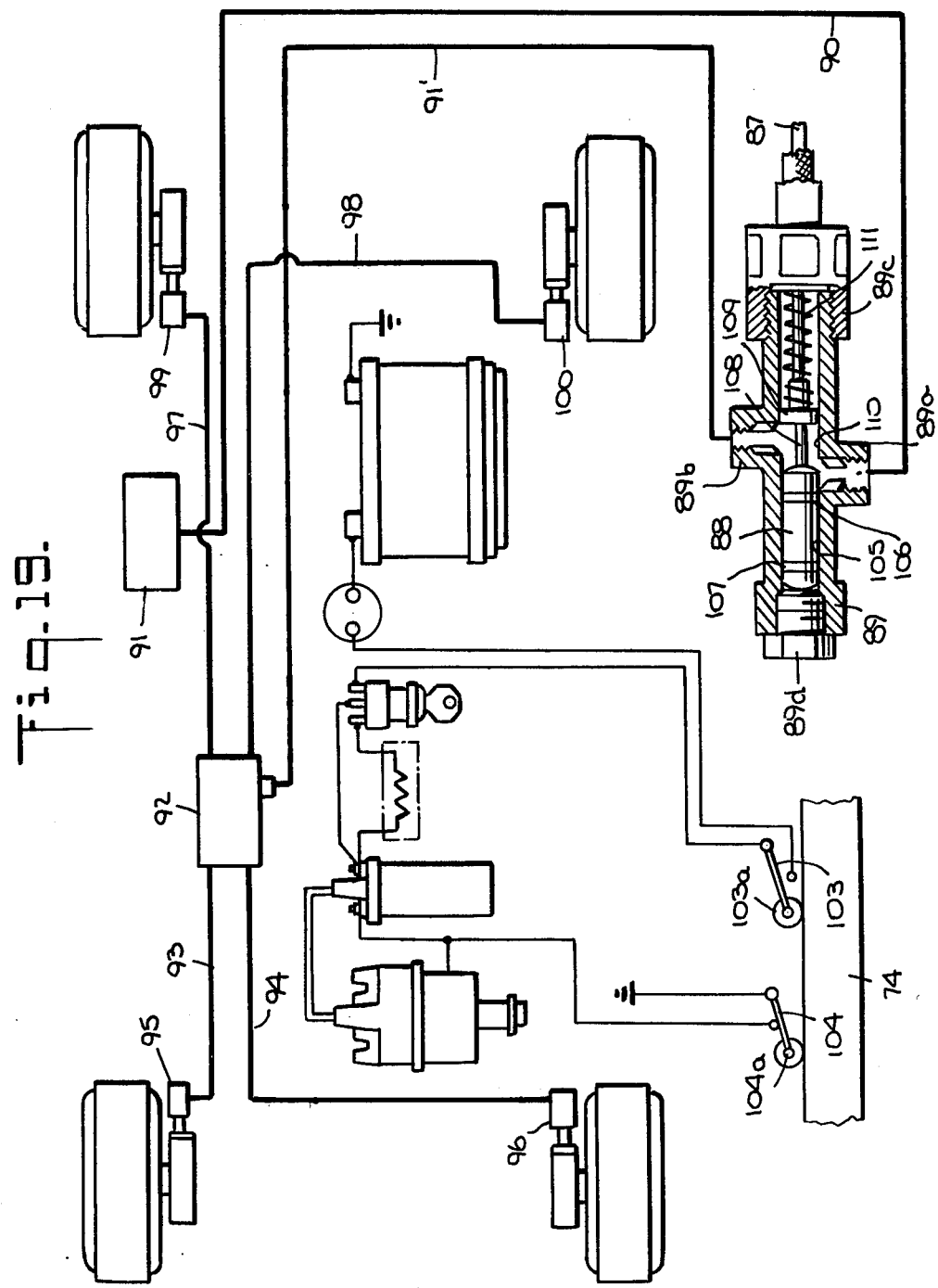

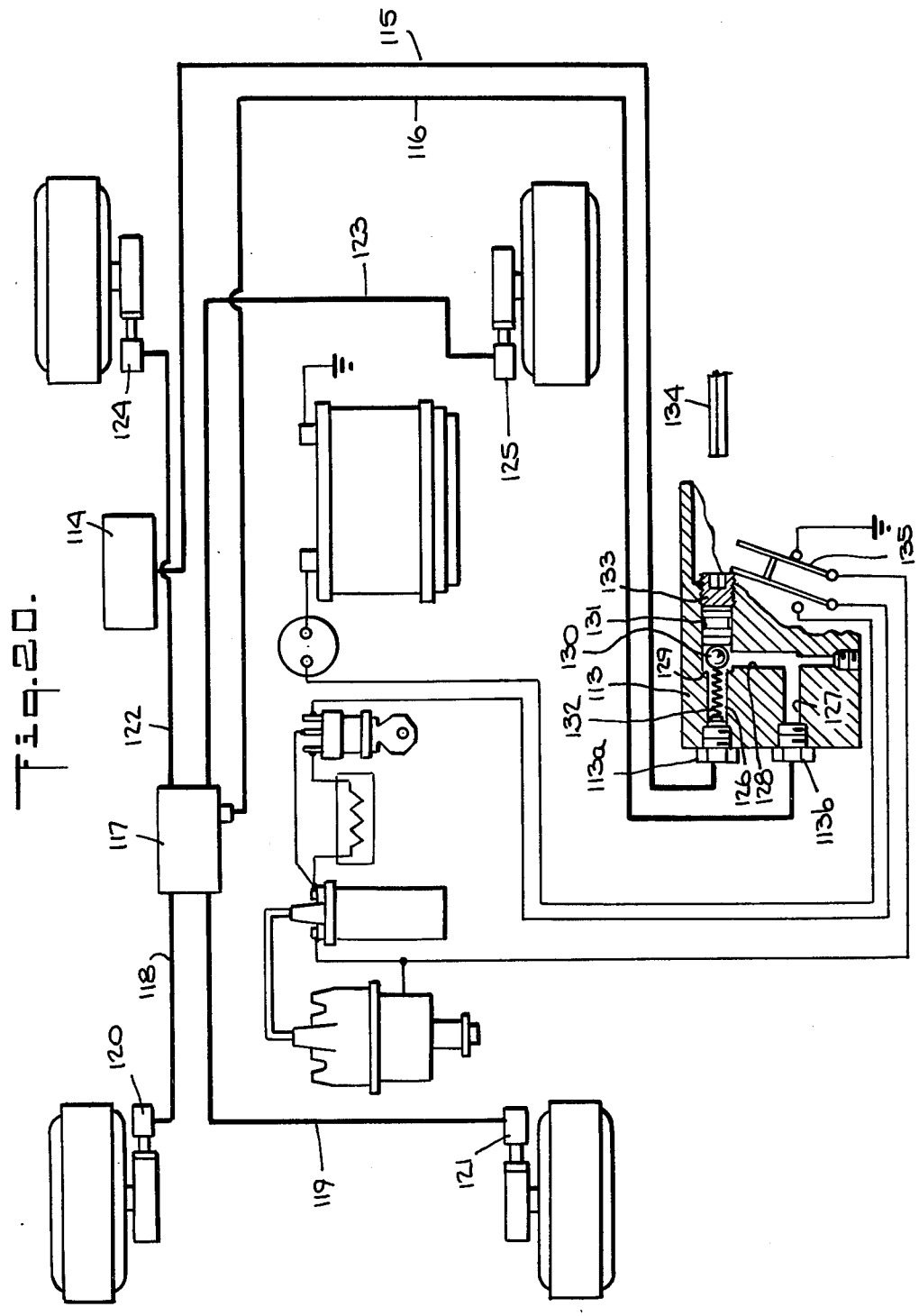

ANTI-THEFT DEVICES FOR AUTOMOTIVE VEHICLES

This invention relates to anti-theft devices for automotive vehicles having fluid pressure-operated brakes, and in particular to devices of this type which can work even when the engines of such vehicles are running.

The theft of automotive vehicles, both private and commercial, is an ever growing problem in our society. Even the development of sophisticated anti-theft devices such as vehicle alarms, Chapman locks, steering wheel column locks, etc., etc., has not stemmed the tide, because the sophistication of the thieves has advanced commensurately. Frequently, it takes a professional thief less than a minute to overcome any of the currently available anti-theft devices. By and large, of course, speed in neutralizing an anti-theft device and starting the vehicle's engine is the principal desideratum for such a thief, because it lessens the chances of his or her being detected and apprehended.

It is an object of the present invention, therefore, to provide novel and improved anti-theft devices for automotive vehicles, which not only will be sufficiently time-consuming for thieves to overcome as to materially increase their risk of detection and apprehension, but will also lead to such an unexpected vehicle response should a thief be successful in starting the engine of the vehicle, that incidences of the theft of vehicles equipped with such devices may well be substantially minimized.

In its broadest aspects, the present invention provides an anti-theft device for an automotive vehicle having fluid pressure-operated brakes, which device includes first means operable, upon activation of a driver-operated means to establish in the brake fluid pressure system a first fluid pressure condition that effects the application of the brakes, for preventing any substantial change in the fluid pressure from its first condition to a second condition that effects release of the brakes, thereby to prevent any normal movement of the vehicle even if its ignition system is energized, the engine started, and the driver-operated means deactivated; and second means for deactivating the first means to permit the establishment of the brake-releasing second pressure condition in the fluid pressure system.

More particularly, the said first means is a lockable member that is accessible to the driver and is operatively connected with a suitable control valve incorporated in the brake fluid pressure system. The lockable member in the case of an hydraulic brake system for an automobile or light van or pick-up truck preferably is a push button-like element connected to the movable valve member, with the button projecting from a housing mounted under the dashboard, for example, and being adapted to be locked in place when depressed into the housing. On the other hand, in the case of a heavy truck or tractor-trailer combination equipped with air brakes, the lockable member preferably is a push button-shaped sleeve which surrounds the knob end of the depressable brake-releasing stem of a conventional air release valve, the sleeve being adapted, when depressed, to be locked to the stem.

In the hydraulic type of brake system, the control valve, which is normally open and in that state has no effect on the operation of the brakes, can be closed by activation of the lockable member. If the latter is activated, therefore, and locked after the driver-operated means has been activated to establish the brake-applying fluid pressure condition in the brake fluid pressure system, i.e. after the brake pedal has been depressed, the closing of the valve prevents any substantial change in the said fluid pressure condition and thereby prevents release of the brakes. In an air brake system, once the driver has applied the brakes and brought the vehicle to a standstill, the brakes can normally be released by depressing the release valve stem. However, if prior thereto the sleeve-shaped member is depressed relative to the stem and until it comes up against an abutment of some sort, for example the dashboard, and the sleeve is then locked to the stem, the latter can no longer be depressed, so that the release valve cannot operate and release of the brakes is prevented.

In either case, therefore, with the brakes thus remaining locked, normal movement of the vehicle is rendered effectively impossible, even with the brake pedal released and the engine started, and the would-be thief will find the vehicle either will not move at all or at best only in an abnormal jerky fashion that will soon attract attention of the vehicle owner and/or passers-by and/or the police.

The said second means preferably is a locking arrangement in the form of a rotary cylinder lock. In the hydraulic type of brake system, the lock can be built into the push button so that its latch element can cooperate with a catch or like adjunct of the housing. In an air brake system, on the other hand, the lock can be built into the stem of the release valve so that its latch element can cooperate with a ratchet tooth arrangement or a simple groove provided on the interior surface of the sleeve surrounding the stem. The lock may be of any type, but for obvious reasons it will be advantageous to utilize a pick-proof cylinder of the deadbolt type, i.e. one requiring the key to be turned for both locking and unlocking, in conjunction with a special (non-conventional) key.

As a refinement of the present invention and to provide an additional theft-inhibiting capability, the anti-theft device may also include one or more electrical switches suitably connected into the vehicle's electrical system and adapted to be operated by the lockable member upon activation thereof, in the one case so as to ground the distributor of the vehicle, and in the other case so as to open the ignition circuit at a point remote from the terminals of the ignition lock switch. In this way, even if a thief were to jump those terminals, the engine would not start.

As yet another refinement of the present invention, an additional lockable member may be provided for inhibiting depression of the brake pedal. This member may be in the form of a ratchet-toothed rod or bar having a hook or transverse arm at one end adapted to be extended over either the face of the brake pedal itself or the brake pedal lever. The body of the rod, which is longer than the normal brake pedal to floor board spacing, is adapted to extend via a suitable passageway through a housing affixed to the brake pedal underside, the housing having an internal latch or pawl member adapted to cooperate with the teeth on the rod in such a way that when the latter is inserted in the housing and the latch or pawl is activated, withdrawal of the rod from the housing becomes impossible. Thus, if the rod is inserted through the housing until the lower end of the rod rests against the floor board, activation of the pawl or latch will effectively prevent depression of the brake pedal. To release the rod, the pawl must be deactivated, which can be done either by providing a separate key-operated cylinder lock on the housing of the brake pedal-latching mechanism or by connecting the pawl with an adjunct of the push button of the brake-locking system via a suitable motion-transmitting wire or cable arrangement. The added advantage which this refinement of the invention provides is that if, due to a malfunction of some sort, the brakes become unlocked without the prior release of the push botton, the brake pedal latching rod will remain in place and unaffected, so that a thief would have to be willing to drive the stolen vehicle without the possibility of being able to apply the brakes, a situation which the thief is not likely to relish as affording him or her a reasonable chance of escape without the risk of a serious accident.

Within the basic framework of the present invention, furthermore, it is also contemplated that the brake-locking and brake pedal-latching functions may be combined in a single unit. The housing for this device is that described above as being mounted on the brake pedal and adapted to have the pedal-latching rod inserted therethrough. The pawl for locking the rod against withdrawal from the housing is associated with a movable element, and another such element is interconnected by a wire or cable with the movable valve member of the control valve. A key-operated cylinder lock is provided on the housing for operating both movable elements, one to release the pawl and the other to open the control valve. The pedal-latching rod upon being inserted into the housing also operates the engine-killing electrical switches.

The foregoing and other objects, characteristics and advantages of the present invention will be more clearly understood from the following detailed description of a number of embodiments thereof when read in conjunction with the accompanying drawings, in which:

FIG. 1 is a fragmentary perspective view of the interior of an automobile at the driver's seat and shows the dashboard-mounted housing and push button of the brake-locking unit and an associated brake pedal-latching unit according to one embodiment of the present invention;

FIG. 2 is a fragmentary, enlarged perspective view of the two units and shows the same with a cable interconnection therebetween;

FIG. 3 is a similar view of only the brake pedal-latching unit but with the latching rod withdrawn from the housing therefor;

FIG. 4 is a front elevational view of the push button and housing of the brake-locking unit;

FIG. 5 is a fragmentary sectional view taken along the line 5—5 in FIG. 4 and shows some of the interior details of the push button and control valve components of the brake-locking unit and of some of the interior details of the latch housing of the brake pedal-latching unit;

FIG. 6 is a sectional view taken along the line 6—6 in FIG. 5;

FIG. 7 is a view similar to FIG. 5 but shows the various parts with the push button depressed and locked to activate the brake-locking and brake pedal-latching units;

FIG. 9 is a sectional view taken along the line 9—9 in FIG. 8 and shows the interior details of one of the control valves;

FIG. 10 is a fragmentary perspective view of the interior of an automobile at the driver's seat and shows an anti-theft device in which a common housing for both the brake-locking and brake pedal-latching units is mounted on the brake pedal, in accordance with another embodiment of the present invention;

FIG. 11 is a fragmentary, enlarged perspective view of the pedal-mounted combined unit of FIG. 10 and shows the brake pedal-latching rod in the process of being inserted and also a cable interconnection between the unit and the movable control valve member;

FIG. 11A shows a modification of the interconnection;

FIG. 12 is a fragmentary side elevational view of the structure shown in FIG. 11 but illustrates the latching rod as fully inserted;

FIG. 13 is a fragmentary front elevational view of the structure shown in FIG. 11 but without the latching rod;

FIG. 14 is a exploded perspective view of a special-headed bolt or screw and a correspondingly configured operating tool for use in constructing and mounting the anti-theft devices of the present invention;

FIG. 15 is a fragmentary, enlarged perspective view of the ratchet and pawl mechanism for the pedal-latching rod of the combined unit shown in FIGS. 11 and 12 and illustrates details of the cable interconnection between the unit and the brake-locking control valve;

FIG. 16 shows a detail of the cable connection at the unit;

FIGS. 17 and 18 are fragmentary, partly sectional views illustrating different operational states of the pawl operating mechanism for the pedal-latching bar as shown in FIG. 15;

FIG. 19 is a fragmentary schematic view, partly in section, of the fluid pressure system for this embodiment of the invention and also illustrates the engine-killing electrical switches and circuit modifications that can be associated with an anti-theft device according to the present invention;

FIG. 20 is a view similar to FIG. 19 but shows a different form of control valve and a somewhat modified electrical switch arrangement;

Figure 8:
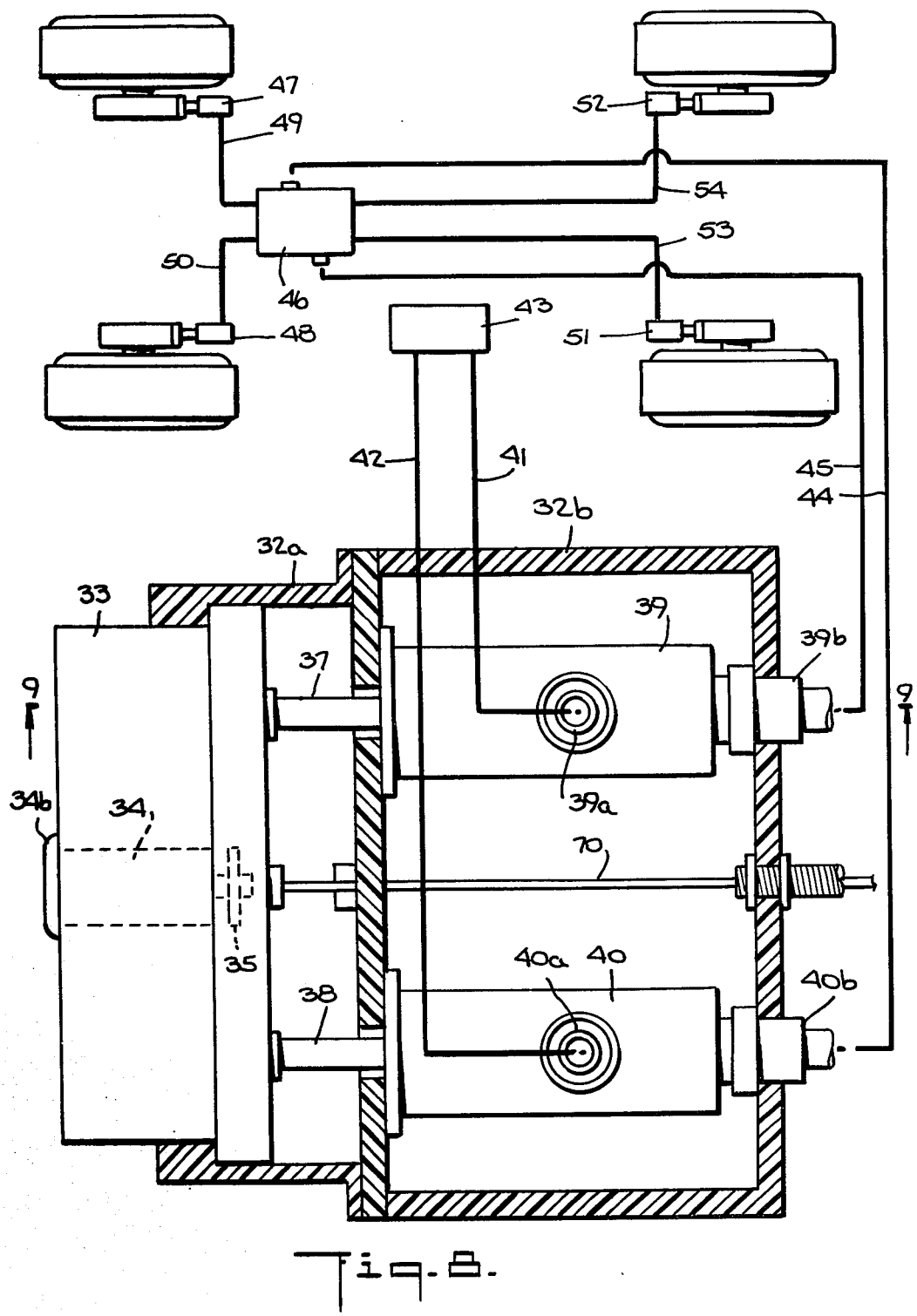
FIG. 8 is a horizontal section through the brake locking unit and diagrammatically shows the hydraulic lines of a dual control valve-equipped brake fluid pressure system running from the master cylinder to the wheel brake cylinders.

Referring now to the drawings in greater detail, the anti-theft device according to the embodiment of FIGS. 1 to 9 is designed for use with an automotive vehicle such as a car or light truck having an hydraulic brake system, and it includes both a brake-locking unit 30 and a brake pedal-latching unit 31 (FIG. 1). The brake-locking unit includes a housing 32 which is adapted to be mounted in a position readily accessible to the driver, for example under the dashboard of the vehicle (FIG. 1). The housing includes a front section 32a and a rear section 32b suitably secured to one another, as by bolts or screws 32c. Mounted in the front housing section 32a is a push button 33 which has incorporated therein a cylinder lock 34 adapted to be operated by means of a key (not shown) of preferably special configuration corresponding to the configuration of a keyhole 34a (FIG. 4) provided in a front plate 34b of the lock. At its rearwardmost end the push button 33 carries a latch element 35 which is operable in one sense or another by the lock 34 and is adapted, depending on the position of the push button 33, to engage a catch element 36 provided in the front housing section 32a, the engagement being either in front of a shoulder 36a (FIG. 5) when the push button is its forward or non-depressed position, or behind shoulder 36b (FIG. 7) when the push button is depressed.

As best shown in FIG. 8, in the anti-theft device according to this embodiment of the invention the push button 33 is somewhat elongated in cross-section and is connected at its rear end with a pair of operating rods 37 and 38 extending rearwardly into the rear housing section 32b. In the latter there are provided two control valves 39 and 40, to be more fully described presently, which are incorporated in the brake fluid pressure system of the vehicle. To this end, the control valves have respective first ports 39a and 40a connected via lines 41 and 42 to the master cylinder 43 of the vehicle, and respective second ports 39b and 40b connected via lines 45 and 44 to a suitable fluid pressure flow distributor 46, the latter serving to direct fluid pressure from the line 44 to the front wheel brake cylinders 47 and 48 via lines 49 and 50, and fluid pressure from the line 45 to the rear wheel brake cylinders 51 and 52 via lines 53 and 54.

A particular type of construction of both of the control valves 39 and 40 is shown in FIG. 9. The valve 39 there illustrated includes a valve body or housing 55 provided with an internal passageway 56 communicating at one end with the port 39a and at its other end with an internal passageway 57 which at its other end communicates with the port 39b. At its juncture with the passageway 56, the passageway 57 is enlarged in diameter somewhat to provide an annular shoulder or valve seat 58. The valve body 55 is further provided with a passageway 59 which is in essence an extension of passageway 57 and has an internal diameter substantially the same as the outer dimension of the valve seat 58. Slidably arranged in the passageway 59 is a movable valve member 60, here shown in the form of a ball, which is engaged at its face directed toward the passageway 57 by a spring 61 tending to bias the ball away from the valve seat 58. At its face directed away from the spring, the ball 60 is in engagement with the end of the rod 37 secured to the rear face of push button 33, the rod extending into the valve through suitable packing means 62.

From FIGS. 8 and 9 it will be clear, therefore, that when the push button is in its non-depressed state (see also FIG. 5), each ball valve member 60 is maintained away from the juncture between the passageway 56 and 57 by the spring 61, so that upon depression of the brake pedal of the vehicle, fluid pressure can flow from the master cylinder 43 via the line 41 into the passageway 56 and thence via the passageway 57 and the port 39b into the line 45 and from there to the rear wheel brake cylinders, while correspondingly fluid pressure can flow from the master cylinder via the line 42 and the appropriate passageways in the control valve 40 to the front wheel brake cylinders. Upon release of the brake pedal, of course, the direction of flow of fluid pressure is simply reversed, being returned to the master cylinder. If, on the other hand, the push button 33 is in its depressed position (FIG. 7), each ball valve member 60 is displaced (to the right in FIG. 9) against the force of its spring 61 until it tightly engages the respective valve seat 58 and thereby blocks communication between the passageways 56 and 57.

It will be understood, therefore, that if the brake pedal of the vehicle is depressed to apply the wheel brakes and the push button 33 is then depressed while the brakes are applied, the positioning of the valve members 60 against the seats 58 effectively prevents any flow of fluid pressure from the wheel brake cylinders back to the master cylinder upon release of the brake pedal, so that even under such circumstances the brakes remain locked. It will be further be understood that since the push button 33 can be returned to its non-depressed state only through operation of the lock 34 to retract the latch element 35 from behind the catch shoulder 36b, the brakes will remain locked until such unlocking operation is completed. With the brakes fully applied, of course, a prospective thief will find it almost impossible to move the vehicle at all even if he or she is able to get the engine running, and even were the engine to provide enough power to overcome the locked position of the brakes it would achieve that only with great difficulty and accompanied by a highly noticeable jerky movement of the vehicle.

Referring further to FIGS. 5 and 7, it will be seen that located within the front housing section 32a there are two electrical switches 63 and 64, preferably microswitches, which are mounted, for example on the outer face of the front wall of the housing section 32b and have their respective operating elements 63a and 64a adapted to be engaged by suitable portions or adjuncts of the rear end of the push button 33. The switch 63 preferably is a 2-way switch connected (in a manner not shown) between the vehicle battery and a pair of pilot lights mounted in the push button 33 behind respective translucent, preferably differently colored, panels 33a and 33b (FIG. 4). The arrangement is such that when the switch operating element 63a is not engaged by the push button, the lamp behind the panel 33b will be lit to indicate that the safety device is OFF, while when the switch is operated to its other state by the push button 33 the lamp behind the panel 33a will be lit to indicate that the safety device is ON or activated. The switch 64 preferably is a dual switch one part of which is normally closed and is connected into the ignition circuit of the vehicle at a point remote from the terminals of the ignition lock switch, while the other part is normally open and is connected into a line running from the distributor to ground, e.g. the vehicle chassis. The arrangement here is such that when the push button is not depressed, the ignition circuit remains in its normal condition and can be closed through operation of the usual ignition lock switch by the driver's ignition key. If, however, the push button is depressed and the operating element 64a engaged to shift the switch 64 to its second state, the first switch part is opened to break the ignition circuit while the second switch part is closed to ground out the distributor. A prospective thief thus will find it effectively impossible to start the engine of the vehicle even if he were able to jump the terminals of the ignition lock switch.

The brake pedal-latching unit 31, as best shown in FIGS. 2 and 3, includes a housing 65 preferably secured to the underside of the brake pedal P. The housing 65 is provided with a through opening 66 adapted to accommodate the body of an elongated rod or bar 67 having a plurality of ratchet teeth 67a formed on one face thereof. The body of the rod 67, which at one end terminates in a transverse arm or hook 67b, is sufficiently long to extend from a point above the level of the brake pedal when the same is in its uppermost or undepressed position, down to the floorboard of the vehicle. Arranged within the housing 65 (FIGS. 5 to 7) is a pawl or similar latch element 68 which is arranged for sliding movement along guide grooves 65a transverse to the length of the rod 67, the pawl being normally biased by a spring 69 toward the passageway 66. At its side facing away from the location of the rod, the pawl is connected to a suitable flexible motion-transmitting element such as a cable or wire 70 which extends into the housing 32 of the brake-locking unit 30, passing through the rear housing section 32b and into the front housing section 32a and there being connected at 70a to a suitable socket provided on the rear end of the push button 33. The arrangement is such that when the push button is in its non-depressed state, the pawl 68 is retracted from the passageway 66 against the force of the spring 69, as shown in FIG. 5. On the other hand, when the push button 33 is depressed, its inward motion is transmitted via the cable 70 to the pawl 68 and the latter is thereby, aided also by the force of the spring 69, pushed forward toward the passageway 66 (see FIG. 7).

It will be understood, therefore, that if the rod or bar 67 is fully extended through the passageway 66 in the housing 65 so as to have its free end resting on the floorboard of the vehicle, the interengagement between the pawl 68 and the then juxtaposed one of the ratchet teeth 67a will effectively prevent withdrawal of the rod from the housing 65. By the same token, of course, since the rod 67 cannot be drawn upwardly, the brake pedal cannot be depressed. This arrangement thus provides an extra measure of anti-theft protection because, even in the unlikely circumstance that, through a malfunction of some sort, the brake-locking unit is rendered ineffective and the prospective thief is able to start the vehicle's engine, he will be forced to drive the vehicle without being able to depress the brake pedal. While driving a vehicle without brakes is, as is well known, feasible as long as the speed is very low, the ability to make a high-speed getaway will be denied the thief by this arrangement, thereby increasing the risk of apprehension. The reason for the provision of the hook or transverse arm 67b at the upper end of the brake pedal-latching member 67 will now be understood. Thus, if such an element were not provided, it might be feasible for the thief to deflect the brake pedal lever upwardly sufficiently to withdraw the housing from the latching rod, inasmuch as the pawl would be able to slip over the ratchet teeth in the upward direction. However, with the arm 67b extended either over the brake pedal lever L as shown in FIG. 2 or, alternatively, over the adjacent portion of the brake pedal P itself, such an option is rendered unavailable.

An anti-theft device according to another embodiment of the present invention, in which the brake-locking and brake pedal-latching functions are combined in a single unit 71 is shown in FIGS. 10 to 13 and 15 to 19. The unit 71 includes a housing 72 (FIGS. 11 and 12), which is secured by suitable bolts or screws 72a to one side of the brake pedal lever L and up against the underside and the top edge of the brake pedal P, and includes a through opening or passageway 73 for accommodating a latch bar or rod 74 having a set of ratchet teeth 74a on one face thereof. In this embodiment of the invention the latch bar is provided with an arm 74b adapted to overlie a portion of the surface of the brake pedal P. Arranged in a front section 72b of the housing 72 is a rotary shaft 75 which extends over the entire length of the housing. At locations corresponding to the opposite side edges of the latch bar 74 the shaft carries a movable element in the form of a pair of discs 76 and 77 provided with respective arcuate guide slots 78 and 79. Slidably received within the guide slots are a pair of pins or like extensions 80 and 81 of a pawl or latch element 82 which overlies the toothed side of the latch bar 74 and is biased toward the latter by a spring 83 interposed between the pawl and a stationary adjunct 84 of the housing.

At one end of the housing section 72b the shaft 75 further carries another movable element in the form of a disc 85. Swivelly connected at 86 to the disc 85 adjacent its periphery is one end of a suitable motion-transmitting wire or cable 87 which extends tangentially out of a disc-covering portion 72c of the housing and at its other end is connected to the movable valve member 88 (FIG. 19) of a control valve 89. The latter has a port 89a communicating via a line 90 with the master cylinder 91, and has another port 89b communicating via a line 91' with a fluid pressure distributor 92 which directs fluid pressure via lines 93 and 94 to the front wheel brake cylinders 95 and 96 and via lines 97 and 98 to the rear wheel brake cylinders 99 and 100. At its other end the shaft 75 is connected with a rotatable core element 101a of a cylinder lock 101 (FIG. 15) adapted to be operated by a special key 102 (see also FIG. 13).

Also arranged within the housing 72 are two electrical switches 103 and 104 (FIGS. 15 and 19) the operating elements 103a and 104a of which are located so as to be activated by the latch bar 74 when the same is inserted into the passageway 73. As shown in FIG. 19, the switch 103 is normally closed and is incorporated in the ignition circuit of the vehicle but at a location remote from the terminals of the ignition lock switch, while the switch 104 is normally open and is connected between the distributor and ground, the arrangement being such that when the latch bar 74 is inserted into place through the housing 72, the switch 103 is opened to break the ignition circuit and the switch 104 is closed to ground out the distributor, thereby to prevent the engine from being started.

Referring further to FIG. 19, it will be seen that as there shown the movable valve member 88 of the control valve 89 is in the form of a barrel element slidably arranged in one section 105 of a longitudinal passageway defined within the valve body. The valve member 88 has at two spaced locations thereon a pair of sealing rings 106 and 107, the distance between the sealing rings being somewhat larger than the diameter of the inner end of the port 89a. At one end the valve member 88 is connected via a rod 108 to the cable or wire 87, the rod being provided with a piston-forming shoulder 109 slidable in a second section 110 of the longitudinal passageway in the control valve 89, and a spring 111 is interposed between the shoulder 109 and an end cap 89c of the valve so as to bias the movable valve member 88 toward the opposite end plug 89d of the valve, thereby to leave the port 89a unobstructed.

It will be understood, therefore, that under normal operating conditions of the vehicle, the latch bar 74 is withdrawn from the housing 72 and the lock 101 is in its "open" state, at which time the disc 85 has been rotated so as to dispose the cable anchor 86 in the position shown in solid lines in FIG. 16. This permits the movable valve member 88 of the control valve 89 to assume the position shown in FIG. 19 and permits free communication between the master cylinder and the wheel brake cylinders. At the same time, the discs 76 and 77 are in the position shown for the disc 76 in FIG. 18, whereby the pins 80 and 81 have been forced to ride up in the respective slots 78 and 79 to retract the pawl 82.

If the combined brake-locking and pedal-latching unit 71 is now to be activated, the brake pedal is depressed to apply the brakes, and the key 102 is then turned to operate the lock 101 to its "closed" state, which causes the disc 85 to be rotated so as to displace the cable anchor 86 to the position shown in broken lines in FIG. 16. This in turn causes the movable valve member 88 to be shifted from its rest position shown in FIG. 19 to the position in which it bridges and hence closes the port 89a, thereby to prevent return flow of fluid pressure from the wheel brake cylinders to the master cylinder. At the same time, of course, the discs 76 and 77 are rotated to the position thereof shown for the disc 76 in FIG. 17, whereby the pawl 82 is shifted into its downwardly protracted position. The brake pedal is then released, but the brakes remain locked because the valve member 88 remains where it is. Finally, the brake pedal-latching bar 74 is inserted into the passageway 73 in the housing 72 until the free end of the bar abuts against the floorboard of the vehicle (FIGS. 12 and 15). This insertion is rendered possible by the fact that the ratchet teeth 74a can slip past the yieldingly mounted pawl 82 in the direction of insertion of the bar. Once the bar has been fully inserted, however, retraction thereof and withdrawal from the housing is inhibited by the locking action of the pawl on the bar via the particular one of the ratchet teeth which it then engages, as shown in FIG. 15. During the insertion of the bar, furthermore, as previously described, the switches 103 and 104 are operated to open the ignition circuit and ground the distributor, and one of these switches (or, if need be, yet a third switch which has not been shown for the sake of simplicity) can also serve to apply power to a small bulb or pilot light located behind a translucent panel 72d on the front of the housing 72 to indicate that the anti-theft device is ON, i.e. has been activated. To deactivate the brake-locking and pedal-latching unit, of course, the key 102 must be inserted into the lock 101 and operated to shift the discs 76, 77 and 85 back into their starting positions, thereby on the one hand to reopen the control valve so as to reestablish communication between the master cylinder and the wheel brake cylinders, and on the other hand to retract the pawl from its latching position so as to enable the latch bar 74 to be withdrawn from the passageway 73.

It will be noted that in this embodiment of the invention as so far described, only a single control valve is used in the fluid pressure system. It would be readily feasible, however, to use two control valves, one for the front wheel brakes and one for the rear wheel brakes, in a manner analogous to that shown for the embodiment of FIGS. 1 to 9. In such a system, the wire or cable 87 would not be connected directly to the movable valve member 88 of each control valve but rather would be first connected at 87a to an adapter 112 (shown only schematically in FIG. 11A as comprising a slide member mounted in a suitable frame or guide structure 112a) which would then in turn be connected via a pair of rods or wires 87' to the respective movable valve members of the two control valves. It will be understood, of course, that in any dual-valve system it is always possible to use only one of the valves, for example if it is felt that locking either the front or the rear wheel brakes only, but not both, would suffice to provide the desired degree of anti-theft protection.

It should also be noted at this point that in the interest of hindering or limiting the speed at which a thief might be able to overcome an anti-theft device according to the present invention, it is contemplated that the brake-locking and brake pedal-latching units of the device would be assembled and mounted in place in a vehicle with the aid of special screws or bolts requiring for their insertion or extraction special tools that would not ordinarily be available to the thief. Such special characteristics may take various forms, for example the one shown in FIG. 14, where the screw or bolt 144 is provided with a head having thereon a sector-shaped projection 144a and a cylindrical hole or bore 144b, while correspondingly the tool 145 needed to manipulate the screw or bolt 144 is provided with a gripping portion having thereon a sector-shaped recess 145a and a cylindrical pin 145b. Other variants will, of course, readily suggest themselves to those skilled in the art.

Referring now to FIG. 20, a brake-locking unit is there illustrated schematically which is very similar to those so far described but differs therefrom essentially only in the construction of the control valve. In accordance with this embodiment, the control valve 113 is provided with a pair of ports 113a and 113b, the former of which communicates with the master cylinder 114 via a line 115, and the latter of which communicates via a line 116 with a fluid pressure distributor 117 which in turn communicates via lines 118 and 119 with the front wheel brake cylinders 120 and 121 and via lines 122 and 123 with the rear wheel brake cylinders 124 and 125. Within the body of the control valve 113 the ports 113a and 113b communicate, respectively, with two parallel passageways 126 and 127 which at their other ends communicate with each other via a transverse passageway 128. The passageway 126 at its juncture with the passageway 128 is enlarged somewhat in diameter to provide a seat 129 for a ball-shaped movable valve member 130. The latter is normally biased away from the valve seat 129 and into the proximate end region of a passageway 131 (of the same larger diameter as the ball and the valve seat) by a spring 132 which is disposed in the passageway 126 and maintains the ball in contact with the inner end face of a plug 133 adapted to be moved along the passageway 131 with the aid of a special key 134. The plug 133 is further mechanically linked with a preferably double-pole switch 135 which is arranged so that when the plug is moved inwardly of the passageway 131 to press the valve member 130 against the valve seat 129, thereby to interrupt the communication between the master cylinder and the wheel brake cylinders, the switch will be in the position shown in FIG. 20 where one of its parts grounds the distributor while the other of its parts opens the ignition circuit. This brake-locking unit may, of course, also be accompanied by a brake pedal-latching unit, but since that would ordinarily be the same as the one shown in FIGS. 1 to 9 (except for the fact that, because of the special means used to lock and unlock the control valve, the pedal-latching unit would have to have a separate means for locking and unlocking the latch bar) a further description of the operation of the device according to this embodiment of the present invention is not believed necessary.

While the basic principles of the present invention have so far been described as applied to automotive vehicles, especially passenger cars, equipped with hydraulic brake systems, they can be applied as well to other types of vehicles, such as heavy trucks and tractor/trailer combinations, which are equipped with air brakes. In a vehicle of this type, the air brakes are applied as usual by the driver depressing the brake pedal, but after the brakes have locked and the vehicle has come to a halt, their release normally also entails the driver depressing the activating knob of the stem of an air release valve. In accordance with a further embodiment of the present invention, therefore, an anti-theft device can be provided to lock the air release valve against operation and thereby to maintain the brakes in locked condition so as to prevent movement of the vehicle.

Figure 21:
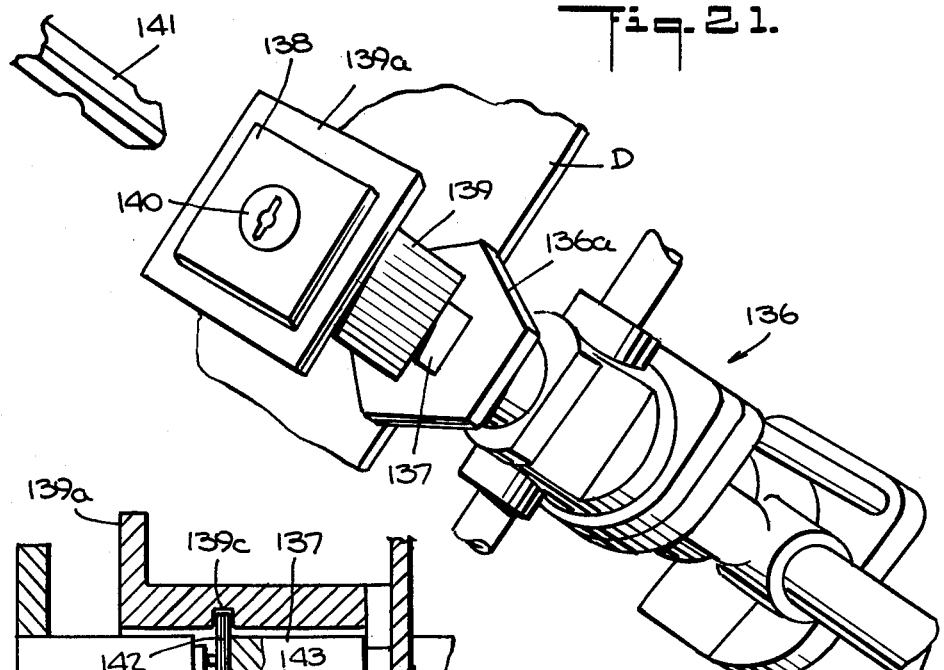
FIG. 21 is a fragmentary perspective view of an essentially conventional air release valve for use in trucks having air brakes and shows the valve as modified by being combined with a push button-type anti-theft device for brake-locking purposes according to the present invention.
Figure 24:
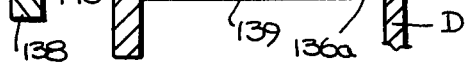
FIG. 24 is a view similar to FIG. 23 and shows a slightly modified construction of the locking arrangement for such a truck anti-theft device.
Figures 22, 23:
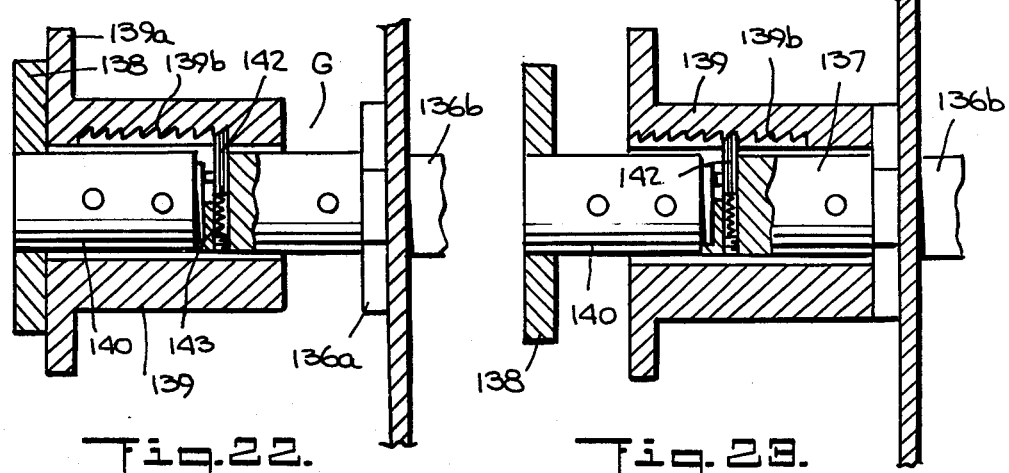
FIGS. 22 and 23 are fragmentary, partly sectional views of the truck anti-theft device incorporated in the valve shown in FIG. 21 and illustrates the device in its brake-releasing and brake-locking states, respectively.

Referring now more particularly to FIGS. 21 to 24, the air release valve 136 there shown is of generally conventional construction and none of its details will, therefore, be described herein. The valve is generally mounted directly behind the dashboard D of the vehicle, being secured thereto by a nut 136a screwed onto a threaded nipple 136b extending through the dashboard. The release stem 137 of the valve projects beyond the dashboard and terminates in a push button-like head 138. The anti-theft device as applied to this type of valve includes a sleeve 139 which slidably surrounds the body of the stem intermediate the head 138 thereof and the dashboard D, the sleeve at its outer end having a peripheral flange 139a sufficiently large to project somewhat beyond the outline of the push button head 138 of the stem 137. The sleeve may be resiliently biased (in a manner not shown) upwardly along the stem so as normally to be located with its flange 139a bearing against the underside of the head 138, as shown in FIG. 22. In its interior surface the sleeve is provided either with a series of grooves in the nature of ratchet teeth 139b, as shown in FIGS. 22 and 23, or alternatively with a single peripheral groove 139c, as shown in FIG. 24. In order to enable the desired locking function to be achieved, the outer end region of the stem is modified, in accordance with the present invention, through the incorporation therein of a cylinder lock 140 adapted to be operated only by a specially configured key 141 (FIG. 21). Inwardly of the sleeve 139, the stem carries a transversely protractable and retractable latch element 142 adapted to engage the ratchet teeth 139b or the peripheral groove 139c, preferably under the outward biasing force of a spring 143.

In the normal operating condition of the vehicle, the sleeve is in its outwardmost position as shown in FIG. 22, and the size of the gap G between its innermost end and the nut 136a is sufficient to permit the stem 137 to be depressed sufficiently to release the brakes when necessary. At such time the sleeve is maintained in place either by the latch element 142 being received in preferably the lowermost one of the ratchet tooth grooves, as shown in FIG. 22, or by means of the biasing spring (not shown) for the sleeve (a spring would be needed, for example, in a construction such as shown in FIG. 24 where the latch element 142 would be merely pressed against the inner surface of the sleeve).

When the anti-theft device is to be activated, with the vehicle stopped and the brakes applied, the sleeve 139 is pushed inwardly along the stem 137 until the innermost end of the sleeve abuts against the nut 136a. This is possible in the construction shown in FIGS. 22 and 23 because the ratchet teeth can slide past the yielding latch element 142, while in the construction shown in FIG. 24 there is no impediment to the movement because the tip of the latch element is sliding along the smooth inner surface of the sleeve. At the end of this movement, i.e. as soon as the sleeve abuts against the nut 136a, the latch element snaps into the then opposite one of the grooves defined by the teeth 139b or into the groove 139c, as the case may be, whereupon any reverse movement of the sleeve along the stem, and conversely any inward movement of the stem relative to the sleeve, is inhibited. Thus, since the stem 137 can then not be depressed, the release valve 136 cannot be operated to release the brakes, and movement of the vehicle is prevented until such time as the lock 140 is operated by means of the key 141 to retract the latch element 142 from its groove to permit the sleeve to move upwardly relative to the stem and thereby reestablish the possibility of the stem being depressed to release the brakes.

It will be understood that the foregoing description of preferred embodiments of the present invention is for purposes of illustration only, and that the various structural and operational features herein disclosed are susceptible to a number of modifications and changes none of which entails any departure from the spirit and scope of the present invention as defined in the hereto appended claims.

What is claimed is:

1. An anti-theft device for an automotive vehicle having an engine, an ignition system for the engine, a set of wheels, respective brakes for the wheels, a fluid pressure system for shifting the brakes, in dependence on the existence of either a first or a second fluid pressure condition in the fluid pressure system, into either a first state in which the brakes are locked or a second state in which the brakes are released, and driver-operated means controlling the fluid pressure system for establishing therein the selected one of said first and second fluid pressure conditions; said device comprising:

first means operable, upon activation of said driver-operated means to establish said first fluid pressure condition in said fluid pressure system and the consequent shifting of said brakes into said first state thereof, for preventing any substantial change in said fluid pressure system from said first to said second fluid pressure condition, thereby to prevent any normal movement of the vehicle even if the vehicle's ignition system is energized, the engine is started, and the driver-operated means is deactivated; and second means for deactivating said first means to permit establishment of said second fluid pressure condition in said fluid pressure system and the consequent shifting of said brakes into said second state thereof upon deactivation of said driver-operated means.

2. An anti-theft device as claimed in claim 1, further comprising first electric circuit means operable, upon activation of said first means, for connecting the distributor of the vehicle to ground.

3. An anti-theft device as claimed in claim 1 or 2, further comprising second electric circuit means operable, upon activation of said first means, for opening the ignition circuit of the vehicle independently of the ignition lock terminals.

4. An anti-theft device as claimed in claim 1, and wherein said driver-operated means is a brake pedal; further comprising:
  third means adapted to be mounted on and locked to said brake pedal and having a portion which, in the locked state of said third means, extends from the brake pedal to the floor board of the vehicle and inhibits depression of said brake pedal; and
  fourth means for releasing said third means.

5. An anti-theft device as claimed in claim 1 or 4;
  said first means comprising a control valve connected in said fluid pressure system between the master cylinder and the respective wheel brake cylinders, a housing located in the driver's section of the vehicle and having an internal catch element, a push button member mounted in said housing and carrying a movable latch element interiorly of said housing which is adapted to engage behind said catch element for locking said push button member in its depressed state, and means operatively connecting said push button member to said control valve for closing and opening the return flow path for fluid pressure from said wheel brake cylinders to said master cylinder in response to depression and release, respectively, of said push button member; and
  said second means comprising a key-operated cylinder lock incorporated in said push button member and operatively connected with said latch element for selectively disengaging the latter from said catch element.

6. An anti-theft device as claimed in claim 5, wherein said push button member is mechanically connected to the movable valve member of said control valve.

7. An anti-theft device as claimed in claim 4, further comprising fifth means mechanically interconnecting said second and fourth means for enabling release of said third means jointly with the deactivation of said first means.

8. An anti-theft device as claimed in claim 4 or 7, further comprising second electric circuit means operable by said third means, upon the latter being mounted on said brake pedal, for opening the ignition circuit of the vehicle independently of the ignition lock terminals.

9. An anti-theft device as claimed in claim 4 or 7, further comprising first electric circuit means operable by said third means, upon the latter being mounted on said brake pedal, for connecting the distributor of the vehicle to ground.

10. An anti-theft device as claimed in claim 9, further comprising second electric circuit means operable by said third means, upon the latter being mounted on said brake pedal, for opening the ignition circuit of the vehicle independently of the ignition lock terminals.

11. An anti-theft device as claimed in claim 4;
  said first means comprising a control valve connected in said fluid pressure system between the master cylinder and the respective wheel brake cylinders, a housing secured to the brake pedal, a first movable element carried by said housing, and means operatively connecting said first movable element with said control valve for closing and opening the return flow path for fluid pressure from said wheel brake cylinders to said master cylinder in response to movements in one sense or another, respectively, of said first movable element;
  said third means comprising a ratchet-toothed bar, a through passageway in said housing for accommodating said bar, said bar being sufficiently long to extend from above said brake pedal in the highest position of the latter down to the vehicle floor board, a second movable element carried by said housing, and a pawl operatively connected with said second movable element for movement into and out of engagement with the bar teeth in a sense inhibiting withdrawal of said bar upwardly through said housing; and
  said second and fourth means jointly comprising a single key-operated cylinder lock, and means operatively connecting said lock to both said first and second movable elements.

12. An anti-theft device as claimed in claim 1, and wherein said fluid pressure system is an air brake system, and said driver-operated means includes both a brake pedal and an air release valve having a depressable valve-operating stem with a free end accessible to the driver at the dashboard of the vehicle;
  said first means comprising a sleeve axially movably surrounding said air release valve-operating stem between said free end of the latter and the dashboard, said sleeve having at least one peripheral groove on its inner surface, and said stem including a latch element adapted to extend into said groove, the latter being so located intermediate the ends of said sleeve that said latch element can engage in said groove when said sleeve is substantially in end abutment with said dashboard, thereby to lock said stem against brake-releasing depression; and
  said second means comprising a key-operated cylinder lock incorporated in said stem and operatively connected with said latch element for withdrawing the same from said groove and freeing said stem for depression.

13. An anti-theft device as claimed in claim 12, wherein means are provided for resiliently biasing said sleeve along said stem in the direction away from the vehicle dashboard.

* * * * *